(12) United States Patent
Kenoyer et al.

(10) Patent No.: US 8,077,194 B2
(45) Date of Patent: Dec. 13, 2011

(54) SYSTEM AND METHOD FOR HIGH RESOLUTION VIDEOCONFERENCING

(75) Inventors: Michael Kenoyer, Austin, TX (US); Peter Chu, Lexington, MA (US); Richard Washington, Marble Falls, TX (US)

(73) Assignee: Polycom, Inc., Pleasanton, CA (US)

( * ) Notice: Subject to any disclaimer, the term of this patent is extended or adjusted under 35 U.S.C. 154(b) by 385 days.

(21) Appl. No.: 12/349,409

(22) Filed: Jan. 6, 2009

(65) Prior Publication Data

US 2009/0115838 A1 May 7, 2009

Related U.S. Application Data

(63) Continuation of application No. 10/814,364, filed on Mar. 31, 2004, now abandoned, which is a continuation of application No. 10/214,976, filed on Aug. 7, 2002, now abandoned.

(60) Provisional application No. 60/310,742, filed on Aug. 7, 2001.

(51) Int. Cl.
    *H04N 7/14* (2006.01)
(52) U.S. Cl. ............... 348/14.08; 348/14.07; 348/14.12
(58) Field of Classification Search ..... 348/14.01–14.16
    See application file for complete search history.

(56) References Cited

U.S. PATENT DOCUMENTS

| | | | |
|---|---|---|---|
| 3,618,035 A * | 11/1971 | Simms, Jr. | ............ 709/204 |
| 4,311,874 A | 1/1982 | Wallace, Jr. | |
| 4,494,144 A | 1/1985 | Brown | |
| 5,280,540 A | 1/1994 | Addeo et al. | |
| 5,335,011 A * | 8/1994 | Addeo et al. | ............ 348/14.1 |
| 5,487,665 A | 1/1996 | Lechner et al. | |
| 5,686,957 A | 11/1997 | Baker | |
| 5,864,681 A | 1/1999 | Proctor et al. | |
| 5,900,907 A * | 5/1999 | Malloy et al. | ............ 348/14.1 |
| 6,020,914 A | 2/2000 | Douhet | |
| 6,208,373 B1 | 3/2001 | Fong et al. | |
| 6,297,846 B1 | 10/2001 | Edanami | |
| 6,323,893 B1 | 11/2001 | Tosaya | |
| 6,489,956 B1 | 12/2002 | Deering | |
| 6,577,333 B2 | 6/2003 | Tai et al. | |
| 6,624,841 B1 | 9/2003 | Buchner et al. | |
| 6,677,979 B1 * | 1/2004 | Westfield | ............ 348/14.12 |

(Continued)

FOREIGN PATENT DOCUMENTS

DE    195 31 222 A1    2/1997

(Continued)

OTHER PUBLICATIONS

Supplementary European Search Report received in corresponding application No. EP 02 76 1322 dated Sep. 20, 2006.

(Continued)

*Primary Examiner* — Melur Ramakrishnaiah
(74) *Attorney, Agent, or Firm* — Wong, Cabello, Lutsch, Rutherford & Brucculeri, L.L.P.

(57) ABSTRACT

A system and method for high resolution video conferencing is shown and described. A transmitting station and a receiving station including video cameras or sensors, a plurality of microphones and speakers, video, audio and communication processing engines are disclosed. Video is processed and transferred through the system allowing for multiple video streams to be produced and audio is processed and transferred through the system allowing for sound to be played back with an indication of position in relation to the videoconferencing system.

18 Claims, 8 Drawing Sheets

U.S. PATENT DOCUMENTS

2002/0101505 A1* 8/2002 Gutta et al. .................. 348/14.07

FOREIGN PATENT DOCUMENTS

| EP | 0 615 387 A1 | 9/1994 |
|---|---|---|
| EP | 1039752 A1 | 9/2000 |
| JP | 04237288 | 8/1992 |
| JP | 405276510 | 10/1993 |
| JP | 08-279999 | 10/1996 |
| JP | 409140000 | 5/1997 |
| JP | 10-042264 | 2/1998 |
| JP | 2000-138913 | 5/2000 |
| JP | 2000287188 | 10/2000 |

OTHER PUBLICATIONS

Correspondence; To Terril Lewis of Wong, Cabello, et al.; Michael Kenoyer; Nov. 30, 2004; pp. 1-9.

Correspondence; "U.S. Appl. No. 10/358,758 and Publication No. US 2003/0174146 entitled "Apparatus and Method for Providing Electronic Image Manipulation in Video Conferencing Applications"—Kenoyer" Aug. 10, 2004, Michael Kenoyer.

M. Baldi & Y. Ofek, "End-to-end Delay of Videoconferencing Over Packet Switched Networks," IBM, Res. Rep. RC 20669 (91480), Dec. 1996.

M. Baldi & Y. Ofek, "End-to-end Deloy of Videoconferencing Over Packet Switched Networks," IEEE/ACM Transaction on Networking, vol. 8, No. 4, Aug. 2000.

M. Baldi & Y. Ofek, "Common time Reference for Interactive Multimedia Applications," IEEE International Conference on Multimedia & Expo, 2000.

Letter dated May 6, 2004 from Michael Kenoyer (2 pages).
Letter dated Feb. 27, 2004 from Bill Paape (2 pages).
Letter dated Mar. 25, 2004 from Michael Kenoyer (5 pages).

D. Zotkin et al., "Smart Videoconferencing," 2000 IEEE International Conference on Multimedia & Expo, pp. 1597-1600 (2000).

K.S. Phua et al., "Spatial Speech Coding for Multi-Teleconferencing," Proceedings from the 1999 IEEE International Conference on Acoustics, Speech and Signal Processing, vol. IV ("Multi-Media Technology for Asia-Pacific Information Infrastructure"), pp. 312-316 (1999).

H. Wang et al., "Voice Source Localization for Automatic Camera Pointing System in Videoconferencing," 1997IEEE International Conference on Acoustics, Speech and Signal Processing, vol. IV ("Multidimensional Signal Processing, Neural Networks"), pp. 187-190 (1997).

Y. Huang et al., "Passive Acoustic Source Localization for Video Camera Steering," 2000 IEEE International Conference on Acoustics, Speech and Signal Processing, vol. ii ("Signal Processing and Theory and Methods II Audio and Electroacoustics Speech Processing I"), pp. 909-912 (2000).

D. Zotkin et al., "An Audio-Video Front-End for Multimedia Applications," 2000 IEEE International Conference on Systems, Man & Cybernetics. vol. 2 ("Cybernetics Evolvign to Systems, Humans, Organizations, and their Complex Interactions"), pp. 786-191 (2000).

L.A. Rowe "Webcast and Distributed Collaboration Control Automation," Researcnh Proposal Submitted to NSF, pp. 1-16 (Feb. 1, 2001).

* cited by examiner

SYSTEM AND METHOD FOR HIGH RESOLUTION VIDEOCONFERENCING

CROSS-REFERENCE TO RELATED APPLICATIONS

The present application claims the benefit of priority from U.S. Provisional Patent Application No. 60/310,742, entitled "High Resolution Video Conferencing Bar" filed on Aug. 7, 2001, which is herein incorporated by reference.

BACKGROUND OF THE INVENTION

1. Field of the Invention

The present invention relates generally to conferencing systems, and more particularly to a high resolution videoconferencing system.

2. Description of the Background Art

Conventionally, videoconferencing systems utilize video cameras to capture an image of the conference participants for transmission to a remote conferencing site. A conventional (stationary or movable) video camera can only capture one image or one view of a conferencing site at a certain point in time. In order to capture different images or views of a conferencing site at different points in time, a conventional video camera may be beneficially provided with a device for adjusting a rotational orientation of the camera. Positioning devices designed to rotate the camera about two orthogonal axes typically utilize two actuators: a first actuator rotates the camera about a vertical axis and a second actuator rotates the camera about a horizontal axis perpendicular to the camera's vertical axis. Rotation of the camera about the horizontal axis is referred to as "panning", while rotation about the vertical axis is referred to as "tilting." As such, devices for rotating the camera about the horizontal and vertical axis are commonly referred to as "pan/tilt positioning devices." Further, to capture an image or view that is of a particular interest, such as the image of a speaking conference participant, a conventional video camera would require a set of zoom lenses for performing zooming functions, resulting in a "pan/tilt/zoom" ("PZT") camera.

Disadvantageously, conventional PZT cameras have many shortcomings. First, movement of mechanical components in the positioning device can generate a substantial amount of noise. These movements and noise can be annoying and distracting to the conference participants. More importantly, the noise can interfere with acoustic localization techniques utilized to automatically orient the camera in a direction of the speaking participant. Secondly, the mechanical components in the positioning device may be susceptible to misalignment or breakage due to wear or rough handling, thereby rendering the positioning device partially or fully inoperative. A further disadvantage is complexity in manufacturing of the positioning device; thus resulting in high manufacturing costs and, subsequently, high consumer prices.

With the development of technology, sizes of display screens in videoconferencing systems are getting larger and larger. Consequently, positions of participant speakers on the display screen can change over a large span area. Disadvantageously, however, conventional videoconferencing systems are unable to adjust to a new participant speaker position as the position changes over the large span area.

Therefore, there is a need for a videoconferencing system and method which captures multiple views of a conferencing site without involving a complex mechanical structure. There is another need for a videoconferencing system and method which adjusts acoustics relative to a speaker's position.

SUMMARY OF THE INVENTION

The present invention provides for a videoconferencing system comprising a transmitting station located at a first site, including a plurality of microphones for generating an audio signal in response to a sound source; an audio processing engine for generating a position signal that indicates the position of the sound source and for processing the audio signal; and a communication interface for transmitting the audio and position signals to a communication channel. The plurality of microphones of the videoconferencing system can be arranged in an n-fire configuration as well as a vertical array. The videoconferencing system may also comprise a receiving station located at a second site, including a communication interface for receiving the audio and position signals from the communication channel, a plurality of speakers for playing the audio signal, and an audio processing engine for selectively driving one of the speakers in response to the position signal to play the audio signal on the selected speaker.

The position signal generated by the videoconferencing system is based upon magnitude differences of electric or current signals received from the plurality of microphones. Whereas, if the position of the sound source changes, the audio processing engine generates a new position signal to reflect a position change.

The transmitting station communication interface includes a communication processing engine for encoding and compressing the audio signal and the position signal, and a transceiver device for transmitting the audio and position signals through the communication channel. Conversely, the receiving station communication interface includes a transceiver device, for receiving the audio and position signals through the communication channel, and a communication processing engine for decoding and decompressing the audio signal and the position signal.

In another embodiment, a videoconferencing system comprises a transmitting station located at a first site, including a high resolution video sensor for generating an image, a video memory for storing the high resolution image, a data loading engine for loading image data from the video sensor to the video memory. Additionally, a Field Programmable Gate Array/Application Specific Integrated Circuit (FPGA/ASIC) is coupled to the video memory and data loading engine. The FPGA/ASIC defines a first image section and a second image section within the high resolution image stored in the video memory. Further the FPGA/ASIC can scale the first image section into a first video stream with a first resolution and scale the second image section into a second video stream with a second resolution. A communication interface coupled to the FPGA/ASIC transmits the first video stream and the second video stream to a communication channel. The videoconferencing system may also comprise a receiving station located at a second site, including a communication interface for receiving the first video stream and the second video stream from the communication channel. The receiving station further includes a video processing engine for processing the first video stream and the second video stream and for displaying the first video stream as a first image with a first resolution and displaying the second video stream as a second image with a second resolution, is coupled to the communication interface.

The transmitting station communication interface in this embodiment comprises a communication processing engine for encoding and compressing the first and second video stream, and a transceiver device for transmitting the first and second video stream through the communication channel. Conversely, the receiving station video processing engine of the present embodiment comprises a video memory for storing the first video stream and the second video stream, a data loading engine for loading the first video stream and the second video stream from the receiving station communication interface and an FPGA/ASIC for displaying the first and second image data stream based on the high resolution image stored in the video memory.

In yet another embodiment, a videoconferencing system comprises a receiving station located at a first site having a communication interface for receiving a video signal from a communication channel, a video processing engine for generating a video display output in response to the video signal, and a video display for displaying the video display output. The videoconferencing system may further comprise a transmitting station located at a second site, having a video camera for generating the video signal, a video processing engine for processing the video signal, a phase synchronization engine for synchronizing a phase between the video camera at the transmitting station and the video display output at the receiving station, and a communication interface for transmitting the video signal to the communication channel.

DESCRIPTION OF THE INVENTION

Figure 1:
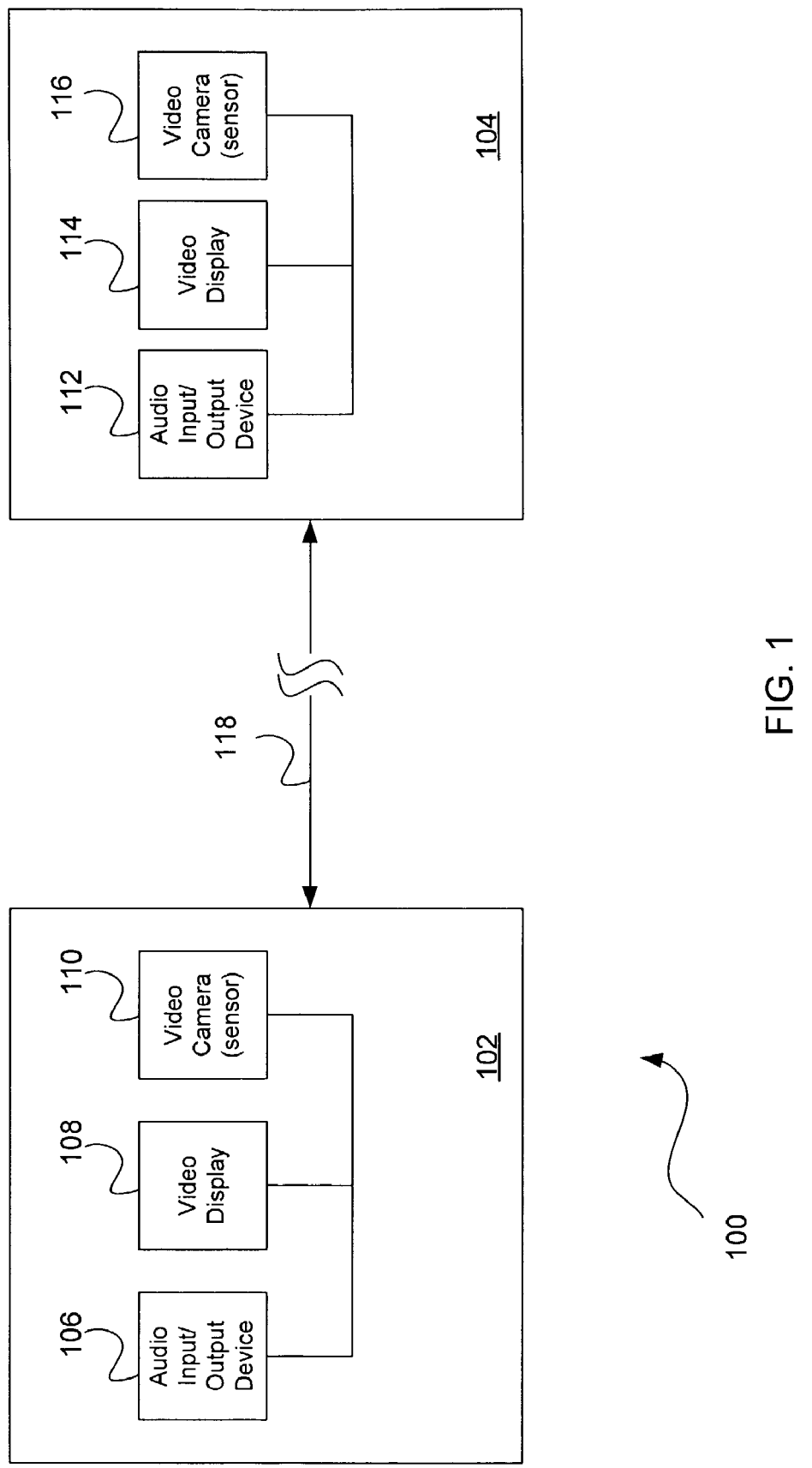
FIG. 1 shows an exemplary videoconferencing system in accordance with the present invention.

FIG. 1 shows an exemplary videoconferencing system 100 in accordance with the present invention. The videoconferencing system 100 includes a first conferencing station 102 and a second conferencing station 104. The first conferencing station 102 includes an audio input/output device 106, a video display 108 and a video camera (or video sensor) 110. Similarly, the second conferencing station 104 includes an audio input/output device 112, a video display 114 and a video camera (or a video sensor) 116. The first conferencing station 102 communicates with the second conferencing station 104 through a communication channel 118. The communication channel 118 can be an Internet, a LAN, a WAN, or any other type of network communication means. Although FIG. 1 only shows two conferencing stations 102 and 104, those skilled in the art will recognize that additional conferencing stations may be coupled to the videoconferencing system 100.

Figure 2:
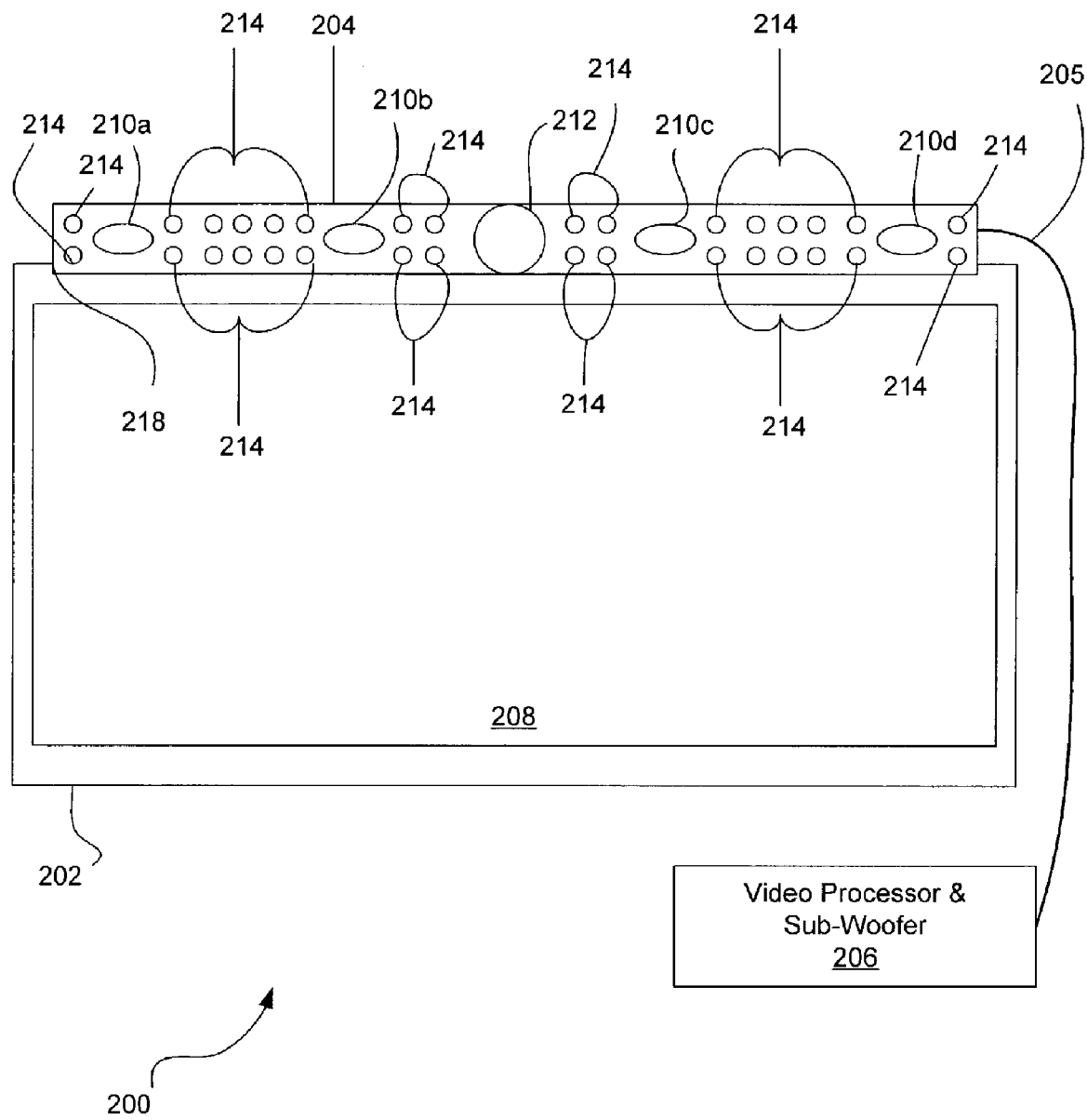
FIG. 2 shows an exemplary conferencing station.

FIG. 2 shows an exemplary conferencing station 200, similar to the conferencing stations 102 and 104 of FIG. 1, in accordance with one embodiment of the present invention. The conferencing station 200 includes a display 202, a high resolution conferencing bar 204, and a video processing unit 206. Preferably, the display 202 is a High Definition ("HD") monitor having a relatively large-size flat screen 208 with a 16:9 viewable area. Alternatively, other view area proportions and other types of displays 202 are contemplated and may be used.

Preferably, the high resolution video conferencing bar 204 contains multiple speakers 210a to 210d, a video sensor (e.g., a high resolution digital video image sensor such as a CMOS video sensor) 212, and a plurality of microphones 214. The speakers 210a to 210d preferably operate at frequencies above 250 Hz. However, the speakers 210a to 210d may operate at any other frequency compatible with various embodiments of the present invention. In one embodiment, the conferencing bar 204 is approximately 36 inch wide by 2 inch high and by 4 inch deep, although the conferencing bar 204 may comprise any other dimension. Typically, the conferencing bar 204 is designed to sit atop the display 202 with a front portion 218 extending slightly below a front edge of the display 202. The positioning of the conferencing bar 204 brings the speakers 210a to 210d, the video sensor 212, and the plurality of microphones 214 closer to the screen 208, and provides a positioning reference at the front edge of the display 202. Other conference bar 204 positions may be utilized in keeping with the scope and objects of the present invention. Further, although only four speakers are shown in FIG. 2, more or less speakers may be utilized in the present invention.

The video sensor 212 has the capability to output multiple images in real-time at a preferred resolution of 720i (i.e., 1280×720 interlaced at 60 fields per second) or higher, although other resolutions are contemplated by the present invention. The resolution of the video sensor 212 is sufficient based on approximately a 65 degree field of view to capture an entire conferencing site. For a wider degree field of view (such as a 90 degree field of view), a limited horizontal pan motor may be provided. Providing this limited horizontal pan motor results in the avoidance of a costly and complicated full mechanical pan/tilt/zoom camera and lens system. Further, a pure digital zoom may be provided with a fixed lens to accommodate up to an 8× or higher effective zoom while maintaining a minimum Full CIF (352×288) resolution image.

The plurality of microphones 214 are located on both sides of the video sensor 212 on the conferencing bar 204, and can be arranged in an n-fire configuration, as shown in FIG. 2, which provides a better forward directional feature. A vertical microphone array can be optionally arranged along a side of the display 202 to provide vertical positioning references.

The conferencing bar 204 is coupled to the processing unit 206 via a high speed digital link 205. The processing unit 206 may contain a sub-woofer device that, preferably, operates from 250 Hz down to 50-100 Hz frequencies. The processing unit 206 will be discussed in more details in connection with FIG. 3. Although the processing unit 206 is shown as being separate from the conferencing bar 204, alternatively, the processing unit 206 may be encompassed within the conferencing bar 204.

Because conference participants may not feel comfortable in view of, or seeing the movement of, the video sensor 212, a smoked glass or similar covering can be installed in front of the video sensor 212 and/or other portions of the conferencing bar 204 so that the conference participants cannot view the video sensor 212, and/or the speakers 210a to 210d and the plurality of microphones 214.

Figure 3:
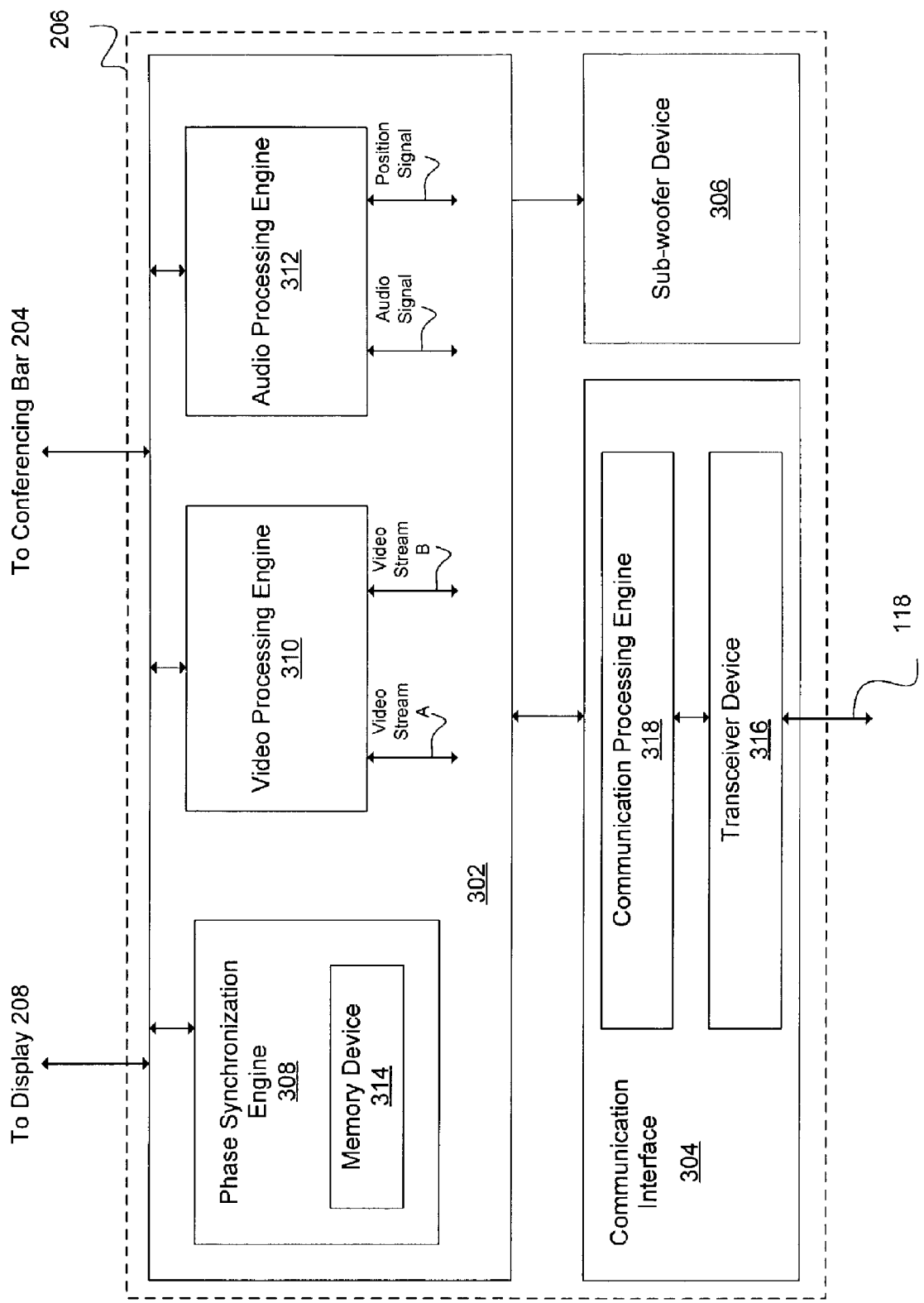
FIG. 3 is an exemplary block diagram illustrating the processing unit of FIG. 2 in greater detail.

FIG. 3 is an exemplary block diagram illustrating the processing unit 206 of FIG. 2 in greater detail in accordance with one embodiment of the present invention. The processing unit 206 preferably includes a processing engine 302, a communication interface 304, and a sub-woofer device 306. The processing engine 302 further comprises a phase synchronization engine 308, a video processing engine 310, and an audio processing engine 312. The phase synchronization engine 308 is able to reduce or minimize negative impact caused by transmission delay. Specifically, the video camera 110 (FIG. 1) at the local (or first) conferencing station 102 (FIG. 1) has an arbitrary phase relative to a video display output at a remote (or second) conferencing station 104 (FIG. 1). Thus, the video display output at the remote conferencing station 104 may be out of phase with the video camera 110 located at the local conferencing station 102.

Further, in transmitting a source video signal from the local conferencing station 102 to the remote conferencing station 104, there is a transmission delay between a time when a source video signal is being generated at the local conferencing station 102 and a time when the source video signal is displayed at the remote conferencing station 104. The transmission delay cannot be compensated for when the video display output at the remote conferencing station 104 is out of phase with the video camera 110 located at the local conferencing station 102. As a result, the transmission delay is added to the video display output at the remote conferencing station 104, which may generate a negative effect in an interactive video conference. For example, when a user at the local conferencing station 102 starts to speak after a pause, participants at the remote conferencing station 104 may still see the user in pause due to the transmission delay. If any of the participants at the remote conferencing station 104 interrupts the user at this moment, the remote participant and the user will talk over each other.

Advantageously, the present invention synchronizes the phase between the video camera 110 located at the local conferencing station 102 and the video display output at the remote conferencing station 104 so that the transmission delay can be compensated for or reduced in the video display output. Specifically, during a video conference, the video camera 110 at the local conferencing station 102 moves at a certain frequency and speed which causes phase shifting relative to the video display output at the remote conferencing station 104. The movement of the video camera 110 at the local conferencing station 102 can be measured and used as a reference to synchronize the phase between the video camera 110 and the video display output. The phase synchronization engine 308 includes a memory device 314 for storing a phase synchronization module for performing the phase synchronization or locking function.

In operation, to transmit a source video signal, the video processing engine 310 first receives a high resolution image from the video sensor 212 (or video camera 110) and stores the image into a video memory (not shown). The video processing engine 310 then, preferably, defines two image sections (views) within the high resolution image stored in the video memory, and generates two respective video streams for the two image sections (views). Alternatively, more or less image sections and corresponding video streams are contemplated. The video processing engine 310 then sends the two video streams to the communication interface 304. Conversely, to display a remote video signal from a remote site, the video processing engine 310 receives at least two video streams (i.e., Video Streams A and B) from the communication interface 304. The video processing engine 310 then processes the video streams A and B and displays two image views on the screen 208 for the two video streams A and B, respectively.

To transmit a source audio signal, each of the plurality of microphones 214 (FIG. 2) in the conferencing bar 204 receives a sound from an acoustic source (e.g., from a speaking participant) and converts the received sound to an electric or current signal. Because the plurality of microphones 214 are located at different positions in reference to the conferencing bar 204 and the acoustic source, the electric or current signals in the plurality of microphones 214 have different magnitudes. The magnitude differences in the electric or current signals indicate a position of the acoustic source. Upon receiving the electric or current signals from the plurality of microphones 214, the audio processing engine 312 generates an audio signal and a position signal. The position signal may contain information indicating a speaker's position relative to the conferencing bar 204. If the position of the acoustic source changes, the audio processing engine 312 generates a new position signal to reflect the position change. The audio processing engine 312 then sends the audio and position signals to the communication interface 304.

Conversely, to play a remote audio signal from a remote site, the audio processing engine 312 first receives the audio signal and position signal from the communication interface 304. The audio processing engine 312 then drives one or more of the speakers 210a to 210d (FIG. 2) in the conferencing bar 204 according to the position signal, while the video processing engine 310 is displaying one or more views of an image on the screen 208. The speakers 210a to 210d in the conferencing bar 204 are selected based on the position of the speaking participant displayed on the screen 208. Because the screen 208 has a relatively large size, the present invention improves video conference by making it appear as if the sound is coming from the location of the speaking participant. It should be noted that the speakers 210a to 210d in the speaker array of the conferencing bar 204 operate, typically, at frequencies above 250 Hz, because the sounds within this frequency range have directional characteristics. Consequently, the sub-woofer device 306 (FIG. 3) installed within the video processing unit 206 operates, preferably, at frequencies from 250 Hz down to 50-100 Hz, because the sounds within this frequency range are not directional. Although the present invention is described as including the sub-woofer device 306, those skilled in the art will recognize that the sub-woofer device 306 is not required for operation and function of the present invention. Those skilled in the art will also recognize that any frequency range of acoustics may be utilized in the present invention. For example, lower frequencies may be used for the speakers 210a to 210d in the speaker array of the conferencing bar 204.

The communication interface 304 includes a transceiver device 316 and a communication processing engine 318. The transmission of a communication signal containing an audio signal, a position signal, and two video streams A and B requires the communication processing engine 318 to receive the audio and position signals from the audio processing engine 312 and the two video streams A and B from the video processing engine 310. Subsequently, the communication processing engine 318 encodes and compresses this communication signal and sends it to the transceiver device 316. Upon receiving the communication signal, the transceiver device 316 forwards the communication signal to a remote site through the communication channel 118.

Conversely, to receive a communication signal containing an audio signal, a position signal, and two video streams A and B, the transceiver device 316 receives the communication signal from the communication channel 118 and forwards the communication signal to the communication processing engine 318. The communication processing engine 318 then decompresses and decodes the communication signal to recover the audio signal, position signal, and two video data streams.

Figure 4:
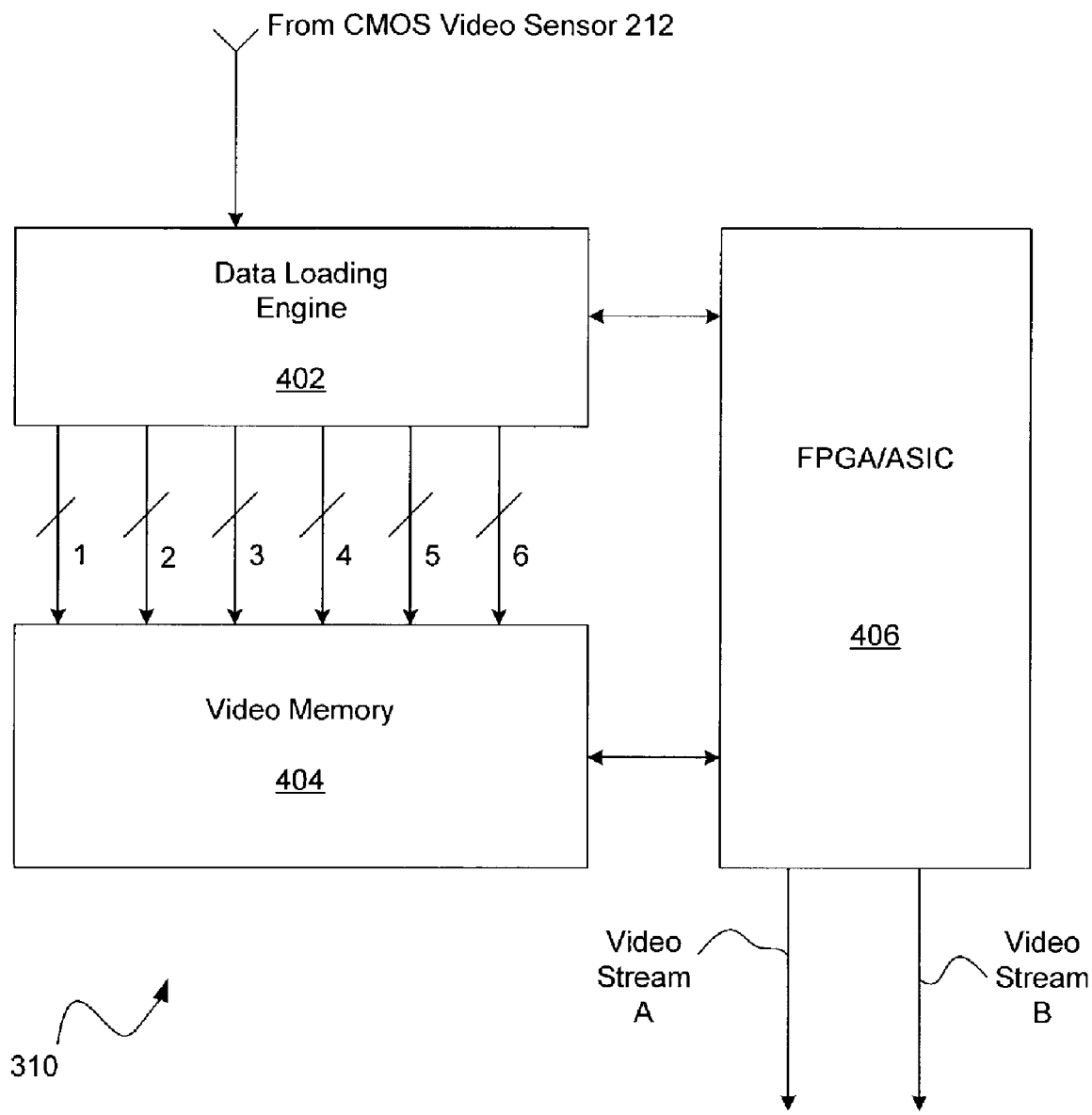
FIG. 4 is an exemplary block diagram illustrating components in the video processing engine of FIG. 3.

FIG. 4 is an exemplary block diagram illustrating components of the video processing engine 310 of FIG. 3. The video processing engine 310 includes a data loading engine 402 coupled to the video sensor 212 (FIG. 2), a video memory 404, and an FPGA/ASIC 406. The data loading engine 402 receives video image data from the video sensor 212 and stores it into the video memory 404, while the FPGA/ASIC 406 controls the data loading engine 402 and the video memory 404. Because the video sensor 212 is, preferably, a high resolution digital image sensor, the video sensor 212 can generate a large amount of image data. For example, with a 3,000×2000 resolution, the video sensor 212 generates 6,000,000 pixels for an image. To increase input bandwidth, the data loading engine 402, preferably, has six parallel data channels 1-6. The FPGA/ASIC 406 is programmed to feed entire image pixels to the video memory 404 through these six parallel data channels 1-6. The FPGA/ASIC 406 is also programmed to define at least two image sections (views) over the image stored in the video memory 404 with selectable resolutions, and to produce two video streams for the two image sections (views), respectively. Although the present embodiment contemplates utilizing six data channels, any number of data channels may be used by the present invention. Further, any number of image sections and corresponding video streams may be utilized in the present invention.

Figure 5:
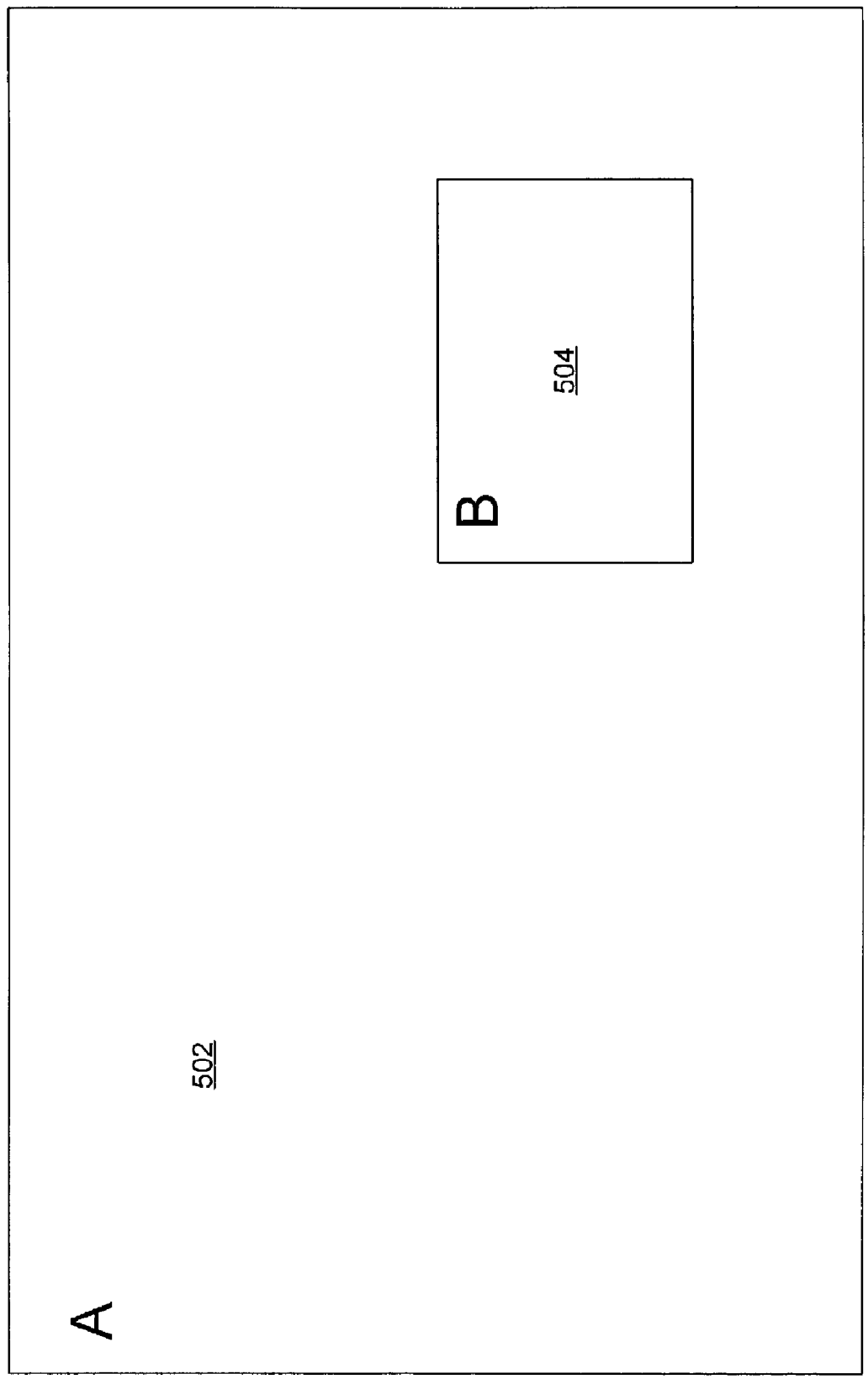
FIG. 5 is an exemplary section (or view) configuration in accordance with the present invention.

FIG. 5 is an exemplary image section (or view) configuration in accordance with one embodiment of the present invention defined by the FPGA/ASIC 406 (FIG. 4) and viewed on the display 202 (FIG. 2). In FIG. 5, a large section A 502 defines an entire view of an image having a 700×400 resolution, while a small section B 504 defines a view having a 300×200 resolution in which a speaking participant from a remote conferencing station is displayed. Based on the image stored in the video memory 404 (FIG. 4), the FPGA/ASIC 406 scales the entire image down to a 700×400 resolution image to produce the video stream A (FIG. 3) for the large section A 502. Subsequently, the FPGA/ASIC 406 scales the section B 504 image down to 300×200 resolution to produce the video stream B (FIG. 3). Because the image stored in the video memory 402 has a relatively high resolution, the two scaled images still present good resolution quality. Those skilled in the art will recognize that other resolutions may be utilized in the present invention.

Advantageously, the present invention has the ability to generate a whole image of a conferencing site while zooming a view from any arbitrary section of the whole image. Further, because at least two video streams are produced for an image, it is possible to transmit a wide angle high resolution image including all participants at a conferencing site (e.g., section A 502) along with an inset zoomed view (e.g., section B 504) showing a particular speaking participant. Alternatively, more or fewer streams may be produced from a single image and consequently more or fewer views displayed. Therefore, the present invention can be used to replace conventional mechanical pan/tilt/zoom cameras.

With current technology, a typical COMS video sensor can effectively provide approximately 65 degree view angle. In reality, a 90 degree view angle may be required. Therefore, a small, inexpensive pan motor can be used to move the COMS video sensor in the horizontal direction. However, because the movement and the resulting noise of the CMOS video sensor are relatively small, such movement and resulting noise are hardly noticeable to the conferencing participants. With the development of technology, the COMS video sensor may be able to provide a cost effective 90 degree view angle.

Figure 6:
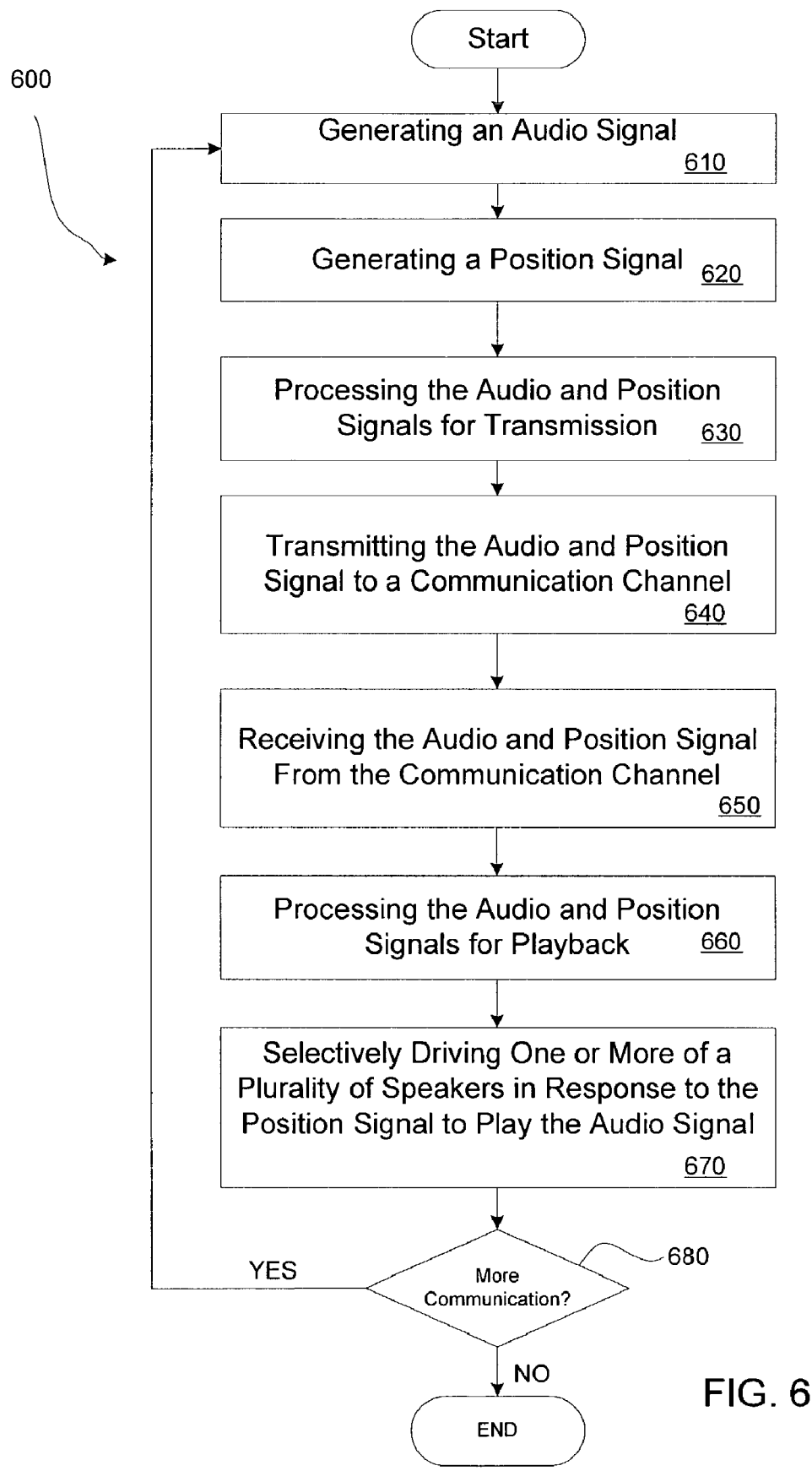
FIG. 6 is a flowchart illustrating an exemplary process for transmitting audio in a videoconferencing system.

In FIG. 6, an exemplary flowchart 600 illustrating a process for transmitting audio data in a videoconferencing system is shown. At step 610, an audio signal is generated at a transmitting station of a first site by the plurality of microphones 214 (FIG. 2) in response to an acoustic source by converting the received sound into an electric or current signal. Next, a position signal is generated at step 620 that indicates a position of the acoustic source. Depending upon the position of the acoustic source from the transmitting station, the current signal will have a particular magnitude. The audio processing engine 312 (FIG. 3) determines the position signal based on the magnitude of the current signal. The audio and position signals are then transmitted to the communication interface 304 (FIG. 3) and then processed at step 630 by the communications processing engine 318 (FIG. 3). This processing can include compressing and encoding the audio and position signals for transmission. The audio and position signals are then transmitted through a communication channel such as an Internet, a LAN, a WAN, or any other type of network communication means at step 640 by a transceiver device. In step 650, a transceiver device at a receiving station of a second site receives the audio and position signals. A communications processing engine processes the audio and position signals at step 660, which may include decompressing and decoding the audio and position signals for playback. Subsequently, at step 670, based on the position signal, one or more speakers at the receiving station are driven to play the audio signal. The position signal generated by the audio processing engine creates a more realistic video conference situation because the playback of the audio signal on one of the speakers makes it appear as if the audio signal is coming from a location of the acoustic source. The system then determines whether more video conferencing is occurring in step 680. If the conference continues, the system repeats steps 610 though 670.

Figure 7:
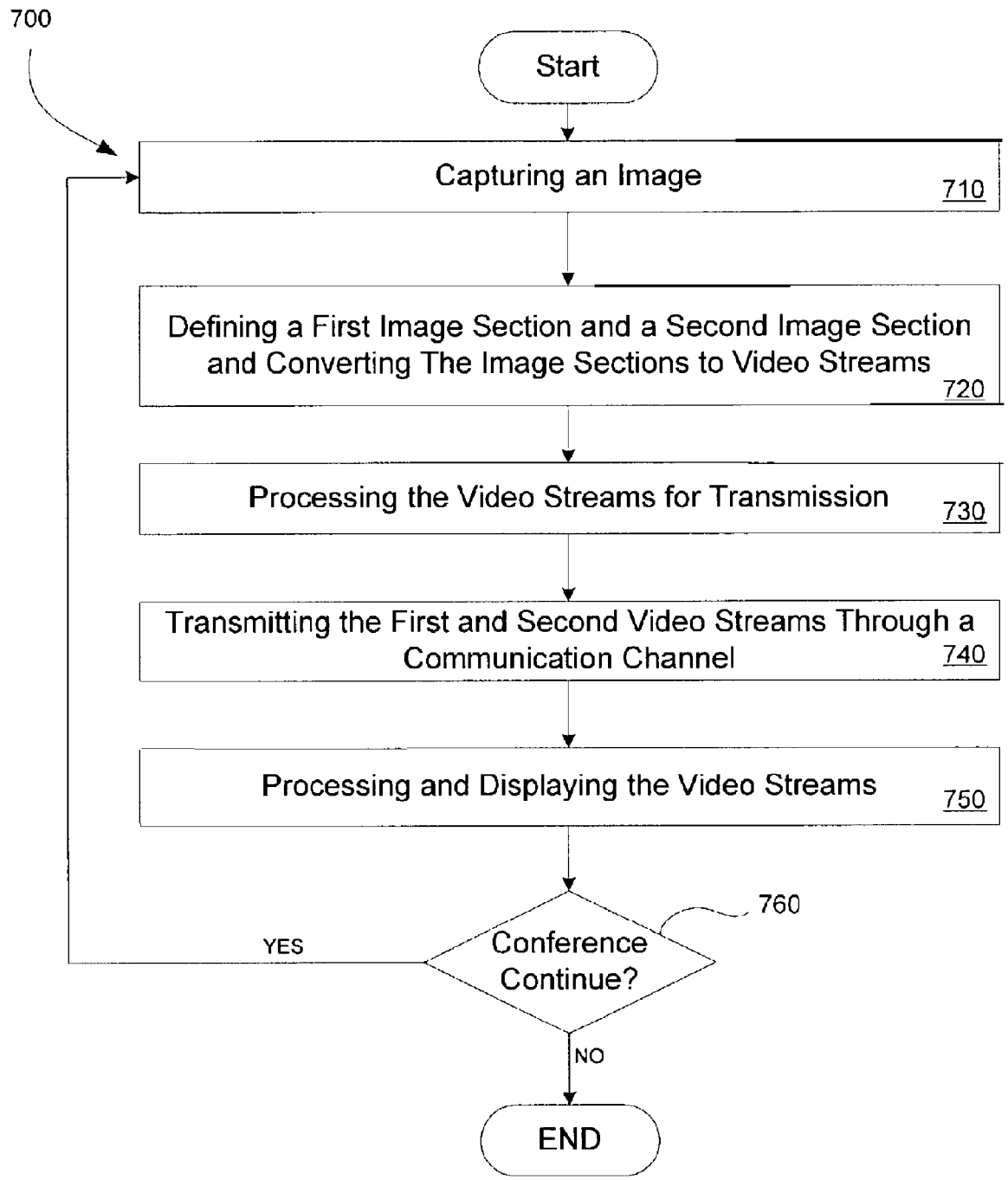
FIG. 7 is a flowchart illustrating an exemplary process for transmitting high resolution images in a videoconferencing system.

In FIG. 7, an exemplary flowchart 700 illustrating a process for transmitting high resolution images in a videoconferencing system is shown. At step 710, a video camera or video sensor captures a high resolution image. The high resolution image is then loaded and stored from the video camera or video sensor to a video memory. Next, the images are converted to video streams in step 720. Within the high resolution image stored in the video memory, a first and a second image section are initially defined by the transmitting station video processing engine. Subsequently, the first and second image sections are scaled to a first video stream having a first resolution and a second video stream having a second resolution. Scaling is implemented by the FPGA/ASIC 406 (FIG. 4) of the video processing engine 310 (FIG. 3), which scales the first image section to a first video stream having a 700×400 resolution and scales the second image section to a second video stream having a 300×200 resolution. Those skilled in the art will recognize that other resolutions may be utilized in the present invention, and that more or less than two image sections, and subsequently more or less than two video streams can also be utilized.

At step 730, the video streams are processed by a transmitting station communication processing engine. This processing can include encoding and compressing of the streams for transmission. Typically, the video streams are encoded and compressed to allow for faster transmission of the video data. Next, the processed video streams are sent to a receiving station through a communication channel in step 740. The communication channel may be any packet-switched network, a circuit-switched network (such as an Asynchronous Transfer Mode ("ATM") network), or any other network for carrying data including the well-known Internet. The communication channel may also be the Internet, an extranet, a local area network, or other networks known in the art. The video streams are then decoded and decompressed by the receiving station video processing engine and displayed on a video display of the receiving station at step 750. The system then determines whether more video conferencing is occurring in step 760. If the conference continues, the system repeats steps 710 though 750. Although the transmission of audio, position, and video data are described in separate flowcharts and methods, the present invention contemplates the simultaneous or near simultaneous transmission of these data.

Figure 8:
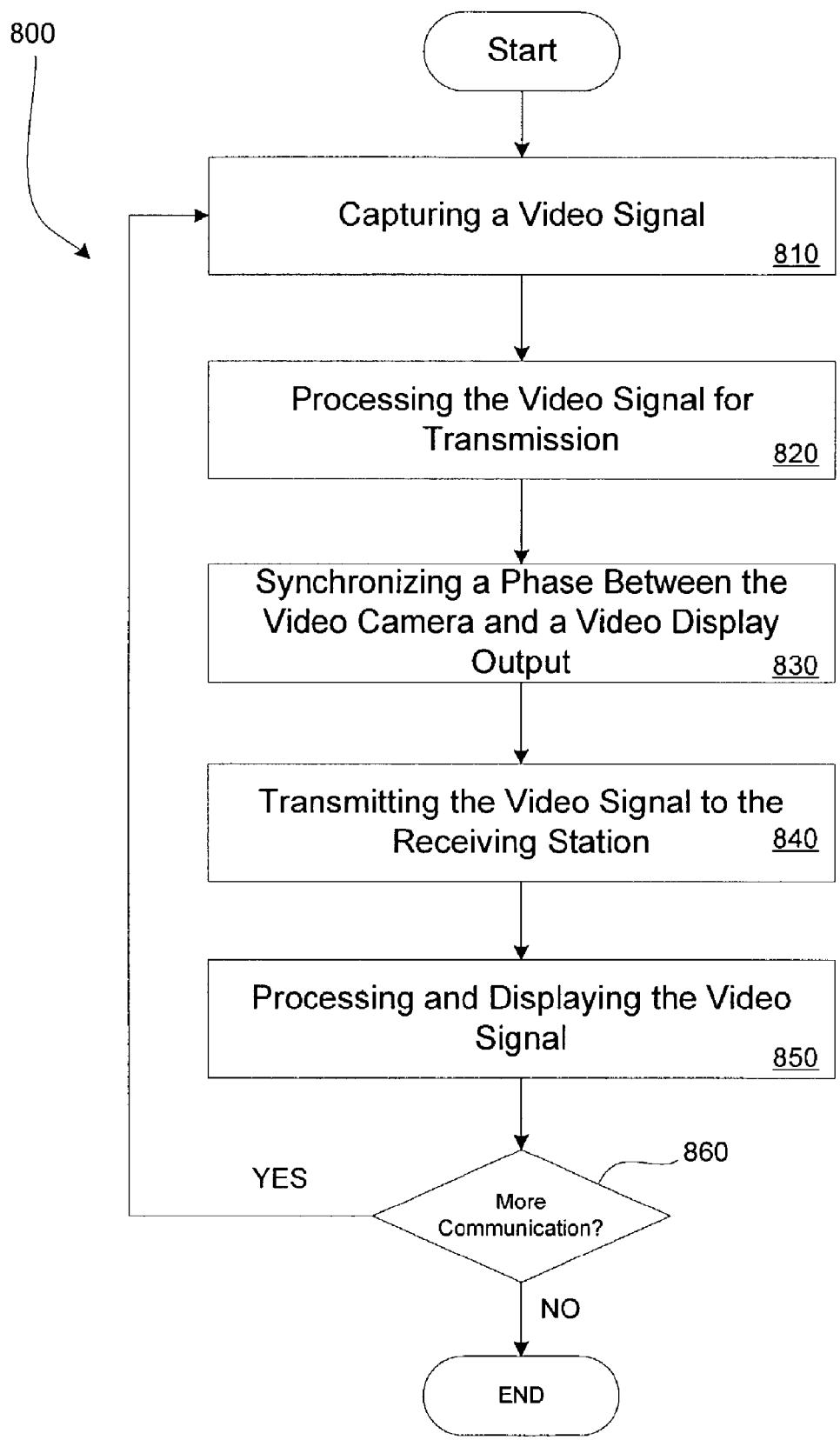
FIG. 8 is a flowchart illustrating an exemplary process for transmitting a video signal in a videoconferencing system.

In FIG. 8, an exemplary flowchart 800 illustrating an alternative process for transmitting a video signal in a videoconferencing system is shown. At step 810, a video camera or video sensor captures a video image. Next, the video signal is processed by a transmitting station communication engine at step 820. This processing can include encoding and compressing the video signal. Typically, the video streams are encoded and compressed to allow for faster transmission of the video data. At step 830, a phase synchronization engine synchronizes a phase between the video camera and a video display output. The synchronizing of the phase between the video camera and the video display output allows for a minimization of a negative impact that can be caused by transmission delay. Specifically, if the video camera is out of phase with the video display output, participants at a receiving station may still see a user in pause at the transmitting station, even after the user at the transmitting station has begun to speak again.

Next, the video signal is transmitted to the receiving station at step 840 via a communication channel. The communication channel may be any packet-switched network, a circuit-switched network (such as an Asynchronous Transfer Mode ("ATM") network), or any other network for carrying data including the well-known Internet. The communication channel may also be the Internet, an extranet, a local area network, or other networks known in the art. Subsequently, at step 850, the video signal is processed for display on the video display output by a receiving station communication processing engine. This processing can include decoding and decompressing the video signal. The video display output is generated in response to the decoded and decompressed video signal and displayed on a receiving station video display. The system then determines whether more video conferencing is occurring in step 860. If the conference continues, the system repeats steps 810 though 850.

The invention has been described with reference to exemplary embodiments. Those skilled in the art will recognize that various features disclosed in connection with the embodiments may be used either individually or jointly, and that various modifications may be made and other embodiments can be used without departing from the broader scope of the invention. For example, it is to be appreciated that while the positioning apparatus of the present invention has been described with reference to a preferred implementation, those having ordinary skill in the art will recognize that the present invention may be beneficially utilized in any number of environments and implementations. Accordingly, the claims set forth below should be construed in view of the full breadth and spirit of the invention as disclosed herein.

What is claimed is:

1. A local videoconferencing device for a videoconferencing system having a local videoconferencing device with a video display and at least one remote videoconferencing device with a video display interconnected through a network, the local videoconferencing device comprising:
    a video sensor for capturing images;
    a plurality of microphones for capturing sound, the plurality of microphones being arranged in known positions relative to one another;
    a plurality of speakers for producing sound, the plurality of speakers being arranged in known positions relative to one another;
    at least one processing unit coupled to the video sensor, the microphones and the speakers; and
    a communication interface coupled to the at least one processing unit and the at least one remote videoconferencing device through the network;
    wherein the at least one processing unit is operative to produce at least a first video stream from signals received from the video sensor and an audio stream and an audio source position signal from signals received from the microphones, wherein the audio source position signal is based upon the magnitude differences of captured sound from the plurality of microphones;
    wherein the at least one processing unit is operative to receive at least one video stream, one audio stream, and one audio source position signal from a remote videoconferencing device; and
    wherein the at least one processing unit is operative to drive the plurality of speakers to reproduce sound according to the received audio stream and audio source position signal.

2. The videoconferencing device of claim 1, wherein the video sensor is operative to produce high resolution video stream, wherein the first video stream is of a first resolution, wherein the at least one processing unit is operative to produce a second video stream, and wherein the second video stream is of a second resolution and is representing an area in the first video stream.

3. The videoconferencing device of claim 2, wherein the first resolution of the first video stream is 700×400 pixels, and wherein the second resolution of the second video stream is 300×200 pixels.

4. The videoconferencing device of claim 2, wherein the maximum resolution of the video sensor is 3000×2000 pixels.

5. The videoconferencing device of claim 2, wherein the second video stream represents images of a speaking videoconference participant.

6. The videoconferencing device of claim 5, wherein the second video stream follows the speaking videoconference participant and changes when the speaking videoconference participant changes.

7. The videoconferencing device of claim 1, wherein the at least one processing unit is operative to synchronize the phases of the signals from the video sensor and a video stream output by a remote videoconference device for display on a remote video display.

8. The videoconferencing device of claim 1, wherein the at least one processing unit is operative to drive the plurality of speakers to reproduce sound according to the received audio signal and audio source position signal by selectively driving one or more speakers in response to the received position signal from the remote videoconferencing device to play the audio signal corresponding to the image of the at least one video stream.

9. The videoconferencing device of claim 1, wherein the video sensor has a wide viewing angle.

10. The videoconferencing device of claim 9, wherein the wide viewing angle is 65 degrees.

11. The videoconferencing device of claim 9, further comprising a pan motor to increase the viewing angle of the video sensor.

12. A method for videoconferencing, wherein a plurality of videoconferencing devices are interconnected through a network, wherein each videoconferencing device comprises a video sensor, a plurality of microphones and speakers, a processing unit, a video display and a network interface, the method comprising:
- capturing video images with the video sensor;
- capturing audio signals with the microphones;
- receiving the video images and the audio signals at the processing unit;
- generating a first video stream from the video images and an audio stream and an audio position signal from the audio signals, wherein the audio position signal is generated based upon magnitude differences of audio signals received from the plurality of microphones;
- transmitting the first video stream, audio stream and audio position signal to a remote conferencing device.

13. The method in claim 12, wherein the video images are of high resolution, wherein the first video stream is of a first resolution.

14. The method in claim 13, further comprising the processing unit generating a second video stream, wherein the second video stream is of a second resolution and is representing an area in the first video stream.

15. The method in claim 14, wherein the second video stream represents images of a speaking videoconference participant.

16. The method in claim 12, wherein the processing unit synchronizes phases of the signals.

17. The method in claim 12, further comprising:
- receiving at least one remote video stream, at least one remote audio stream, and a remote audio position signal from a remote endpoint;
- displaying the at least one remote video stream on the video display; and
- driving the plurality of speakers to reproduce sound by selectively driving one or more of the plurality of speakers in response to the received remote audio position signal.

18. A method for videoconferencing, wherein a plurality of videoconferencing devices are interconnected through a network, wherein each videoconferencing device comprises a video sensor, a plurality of microphones and speakers, a processing unit, a video display and a network interface, the method comprising:
- receiving at a local endpoint via the network interface at least one remote video stream, at least one remote audio stream, and a remote audio position signal from a remote endpoint;
- displaying the at least one remote video stream on the video display; and
- driving the plurality of speakers to reproduce sound by selectively driving one or more of the plurality of speakers in response to the received remote audio position signal, wherein the received remote audio position signal is generated based upon magnitude differences of audio signals received at a plurality of remote microphones.

* * * * *